UNITED STATES PATENT OFFICE.

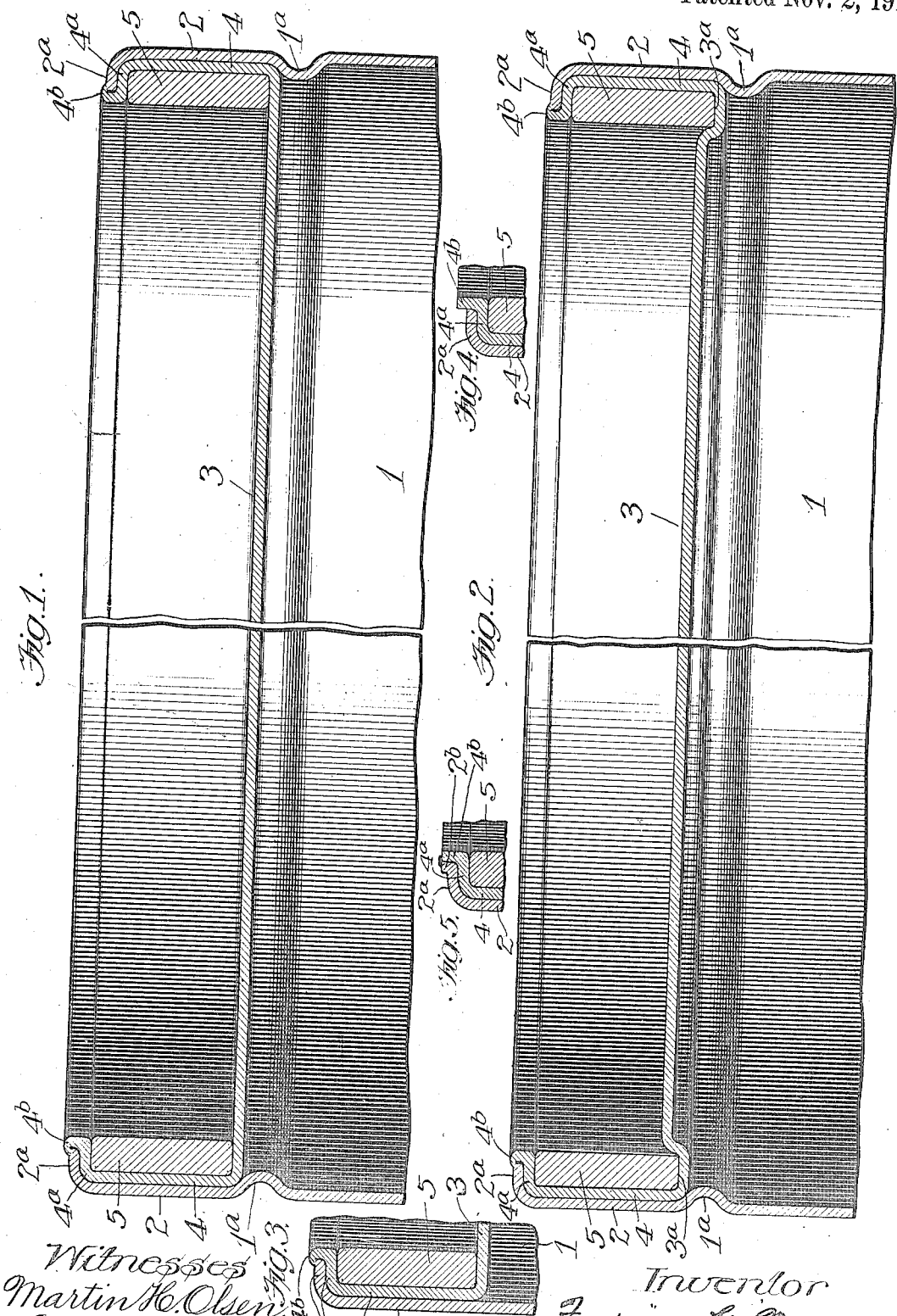

FREDERICK G. WACKER, OF TOLEDO, OHIO, ASSIGNOR TO THE TOLEDO STEEL BARREL COMPANY, OF TOLEDO, OHIO, A CORPORATION OF MAINE.

METALLIC RECEPTACLE.

1,158,596.     Specification of Letters Patent.     Patented Nov. 2, 1915.

Application filed July 17, 1914. Serial No. 851,508.

*To all whom it may concern:*

Be it known that I, FREDERICK G. WACKER, a citizen of the United States, residing at Toledo, Lucas county, Ohio, have invented certain new and useful Improvements in Metallic Receptacles, of which the following is a specification.

My invention relates to improvements in metallic receptacles such as barrels, casks, drums and the like, and the object thereof is to provide a simple and efficient closure for one or both ends of such a receptacle.

My invention relates more particularly to the chime construction which is so made as to provide a tight and rigid connection between the barrel body and the head, which connection is reinforced by a chime ring or hoop. The proper tightness or sealing of the construction is assured by means of welding and in order that the welding may be conveniently and properly performed and may be relieved of all danger of injury or wear, the chime construction is made in the particular way hereinafter explained. This chime construction is such that the receptacle or barrel is adapted to roll or be handled without rolling on the weld, besides which the weld is in an open and accessible place so that the welding operation can be quickly and conveniently done both in the original manufacture of the barrel and in repair if necessary.

Other advantageous features in construction and manufacture will be apparent from the description hereinafter given.

In the drawing Figure 1 is a section of one end of a barrel or drum embodying my invention; Fig. 2 is a similar view showing a modified form of construction; Figs. 3, 4 and 5 detail views showing other modified forms of construction.

Referring to the structure illustrated in Fig. 1, the barrel shell or body 1 is provided with a rim 2. The closure or head 3 is provided with a rim 4 which fits within the rim 2 and within the rim 4 there fits a reinforcing chime ring or hoop 5 which is preferably rectangular in cross section, being a commercial metal shape. The head rim 4 is double flanged at its outer portion, the innermost flange $4^a$ fitting over and upon the top edge of the ring 5 and the outermost flange $4^b$ extending outwardly longitudinal of the axial line of the barrel. The outer edge $2^a$ is rolled or flanged inwardly upon the innermost flange $4^a$ and with its edge in proximity to the outermost flange $4^b$ of the head rim. This latter flange projects outwardly flush with the plane of the flange $2^a$ of the body rim and such flanges are welded together by a welding flame, thereby forming a welding uniting the outer ends of the rims 2 and 4 and efficiently sealing the chime construction against any possibility of leakage. If desired the flange $4^b$ may be extended beyond the plane of the flange $2^a$ as indicated by Fig. 4 and may be welded down. It will be observed that the welding is done at the ends of the receptacle in a position which is entirely open and accessible. Moreover, in rolling and handling the barrel the rolling takes place on the rounded outer portion of the rim 2 and not upon the weld so that in the handling of the barrel the weld is protected against injury and from wear and tear.

In the manufacture of the barrel the head and its ring are inserted in place within the body rim whose outer edge has not yet been rolled inwardly, it being understood that the head rim 2 also has not been rolled or flanged. The parts thus assembled are then acted upon by a suitable press or rolling machine which double flanges the head rim and also rolls over or flanges the outer edge of the body rim. Of course if desired the construction could be formed by two entirely separate operations, for instance the head and its rim could first be acted upon by flanging the same over the chime ring and the structure could then be inserted within the body rim and the operation completed by rolling over the outer edge of the body rim. In the case of a galvanized package, the operation of forcing or flanging the head and body rims over the chime ring breaks off and practically eliminates all of the spelter from such particular parts, with the result that the welding operation is facilitated and made more efficient because the metal is thus cleaned off for the welding operation so that it is not necessary to burn off the spelter. A better weld is obtained because there are no impurities to be dealt with in making the weld. Furthermore, in the welding operation it is simply necessary to weld together the extreme outer edges of the two rims without the necessity of heating up any of the other parts in obtaining a proper weld. The structure thus formed is very rigid and permanent and is moreover very tight and in order to absolutely seal the barrel the welding is done as above stated. If desired the body may be provided with an inwardly-directed circumferential groove 1ª forming a seat for the head.

In Fig. 2, I have shown a construction similar to that of Fig. 1 with the exception that the head is provided at its margin with a circumferential groove 3ª which rests upon the groove 1ª and which receives the lower edge of the chime ring 5.

In Fig. 3, I have illustrated another modification which is the same as Fig. 1 with the exception that the groove 1ª is omitted.

In Fig. 4, I have illustrated a construction in which the flange 4ᵇ of the head extends slightly beyond the plane of flange 2ª of the body to afford somewhat more metal to form the weld.

In Fig. 5 I have illustrated a modification in which the body rim is double flanged, that is provided with a flange 2ª and also with a flange 2ᵇ extending parallel with flange 4ᵇ. These two flanges 2ᵇ and 4ᵇ have their edges welded together.

I claim:

1. A barrel chime construction including in combination with the barrel body and its rim, a closure or head having a rim fitting within the body rim and double flanged at its outer edge, and a chime ring which fits within the head rim and over which the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel.

2. A barrel chime construction including in combination with the barrel body and its rim, a closure or head having a rim fitting within the body rim and double flanged at its outer edge, a chime ring which fits within the head rim and over which the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel, and a welding uniting such outer edge of the rim with said outermost flange of the head rim.

3. A barrel chime construction including in combination with the barrel body and its rim, a closure or head having a rim fitting within the body rim and double flanged at its outer edge, a chime ring which fits within the head rim and over which the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel, the outermost flange of the head rim projecting above the outermost portion of the body rim, and a welding uniting said outermost flange and outermost portion.

4. A barrel chime construction including in combination with the barrel body and its rim, a closure or head having a rim fitting within the body rim and double flanged at its outer edge, a chime ring substantially rectangular in cross section which fits within the head rim and over whose outer edge the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel.

5. A barrel chime construction including in combination with the barrel body and its rim, a closure or head having a rim fitting within the body rim and double flanged at its outer edge, and a chime ring which fits within the head rim and over which the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel, said head having a circumferential groove in which the lower edge of the chime ring fits.

6. A barrel chime construction including in combination with the barrel body and its rim, a closure or head having a rim fitting within the body rim and double flanged at its outer edge, and a chime ring which fits within the head rim and over which the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel, said body having an inwardly-directed circumferential groove forming a seat for the head.

7. A barrel chime construction including in combination with the barrel body and its rim, a closure or head having a rim fitting within the body rim and double flanged at its outer edge, and a chime ring which fits within the head rim and over which the innermost flange thereof fits, the outer edge of the body rim being flanged over said innermost flange with its outer portion in proximity to the outermost flange of the head rim, the proximate outer portions of the body rim and the head rim being substantially parallel with the longitudinal axis of the barrel, said head having an inwardly-directed circumferential groove in which the lower edge of the chime ring fits and which rests upon the body groove.

8. A barrel chime construction including a barrel body and its rim which is double flanged at its outer edge, a head having a rim fitting within the body rim and correspondingly double flanged at its outer edge, the contiguous outer flanges of the body and head being substantially parallel with the longitudinal axis of the barrel, and a chime ring which fits within the head rim and over which the innermost flange thereof fits.

FREDERICK G. WACKER.

Witnesses:
RUFUS H. BAKER,
PHYLLIS HACKETT.